(12) United States Patent
Tateno et al.

(10) Patent No.: US 6,573,962 B1
(45) Date of Patent: Jun. 3, 2003

(54) METHOD OF ARRANGING PARTICULATES LIQUID CRYSTAL DISPLAY, AND ANISTROPIC CONDUCTIVE FILM

(75) Inventors: Akihiko Tateno, Kyoto (JP); Hiroyuki Nakatani, Kyoto (JP)

(73) Assignees: Sharp Kabushiki Kaisha, Osaka (JP); Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/445,593

(22) PCT Filed: Jun. 15, 1998

(86) PCT No.: PCT/JP98/02614
§ 371 (c)(1),
(2), (4) Date: Feb. 28, 2000

(87) PCT Pub. No.: WO98/57224
PCT Pub. Date: Dec. 17, 1998

(30) Foreign Application Priority Data

Jun. 13, 1997 (JP) .............................................. 9-156714
Sep. 22, 1997 (JP) .............................................. 9-257081
Dec. 9, 1997 (JP) .............................................. 9-338613

(51) Int. Cl.$^7$ .......................................................... G02F 1/1339
(52) U.S. Cl. ........................................................... 349/115
(58) Field of Search ................................. 349/155, 141, 349/142, 143, 147

(56) References Cited

U.S. PATENT DOCUMENTS 6,278,233 B1 * 8/2001 Sanou et al. ................ 313/495

FOREIGN PATENT DOCUMENTS

| JP | 361069034 A | * | 4/1986 |
| JP | 4204417 | * | 7/1992 |
| JP | 405249483 A | * | 9/1993 |

* cited by examiner

Primary Examiner—Toan Ton
Assistant Examiner—Hoan Nguyen
(74) Attorney, Agent, or Firm—Connolly Bove Lodge & Hutz

(57) ABSTRACT

This invention has its objects to provide a provide a fine particle arranging method which can accurately control the arrangement of fine particles.

This invention is related to a fine particle which comprises arranging method which comprises arranging charged fine particles on a surface of an object, wherein areas having a relatively high electric potential (+(positive)) and areas having a relatively low electric potential (−(negative)) are alternately formed on said surface of the object, electric lines of force are formed based upon the areas having the relatively high electric potential (+(positive)) and the areas having the relatively low electric potential (−(negative)), and the fine particles are arranged at a relatively +(positive) bottom (1) position and/or a relatively −(negative) bottom (2) position of said electric lines of force.

10 Claims, 9 Drawing Sheets

(I)

(II)

METHOD OF ARRANGING PARTICULATES LIQUID CRYSTAL DISPLAY, AND ANISTROPIC CONDUCTIVE FILM

FIELD OF THE INVENTION

The present invention relates to a fine particle arranging method, and a liquid crystal display and an anisotropic conductive film obtained by such a method.

BACKGROUND OF THE INVENTION

Along with the development of the electronics technology, fine particles have come to be widely used in various fields. With respect to such fine particles, for example, conductive fine particles used for anisotropic conductive films, etc., conductive fine particles used in the field of bonding technology and fine particles used for spacers, etc. in liquid crystal displays are listed. Liquid crystal displays form one of the major fields for the application of the fine particles, and the liquid crystal displays have been widely used, for example, in personal computers, portable electronic devices, etc. In general, as illustrated FIG. 11, the liquid crystal display comprises with two substrates 1 provided with a color filter 4, a black matrix 5, a transparent electrode 3, an alignment film 9 thereon, etc. and a liquid crystal 7 interpolated between these two substrates 1. In this case, the members regulating the gap between the two substrates 1 so as to properly maintain the thickness of the liquid crystal layer are spacers 8.

In a conventional manufacturing method for liquid crystal displays, spacers are sprayed uniformly and at random on a substrate bearing pixel electrodes; therefore, as illustrated in FIG. 11, spacers tend to be placed on the pixel electrodes, that is, on the display section of the liquid crystal display. The spacers are generally formed by a material such as a synthetic resin and glass, and if such spacers are placed on the pixel electrodes, the spacer portions tend to cause light leakage due to depolarization effect. Moreover, light void occurs due to the disturbance of the orientation of the liquid crystal on the spacer surfaces, resulting in degradation in contrast and color tones, and subsequent degradation in the display quality.

In order to solve the above-mentioned problem, an attempt is made to place the spacers only on the black matrix portions that form light-shielding films. The black matrix is provided in order to improve the display contrast of the liquid crystal display and, in the case of the TFT-type liquid crystal display, to prevent the elements from malfunctioning optically due to external light.

With respect to the technique for placing the spacers only on the black matrix portions, that is, portions other than the pixel electrodes of the liquid crystal display, Japanese Kokai Publication Hei-4-256925 discloses a method which comprises holding the gate electrode and the drain electrode at the same electric potential at the time of spraying the spacers. Moreover, Japanese Kokai Publication Hei-5-53121 discloses a method which comprises applying a voltage to the wiring electrodes at the time of spraying the spacers. Furthermore, Japanese Kokai Publication Hei-5-61052 discloses a method which comprises applying a positive voltage to the wiring electrodes with the spacers being negatively charged and sprayed in a dry system.

However, all of these methods are arranging techniques that utilize the wiring electrodes. In other words, all of these methods are designed to deal with the TFT-type liquid crystal display in the classification of liquid crystal displays. Therefore, these arranging techniques are not applied to the STN-type liquid crystal display which has no electrodes corresponding to the wiring electrodes and in which striped electrodes, as they are, form pixel electrodes by being arranged orthogonal to each other on upper and lower substrates.

In the liquid crystal display, the necessity of arranging the spacers (one kind of fine particles) on accurate positions has been described above, and in the other fields of the application of fine particles, techniques for arranging fine particles on accurate positions have been demanded. For example, in the case that an anisotropic conductive film is manufactured by using conductive fine particles, it is also necessary to accurately arrange the conductive fine particles so as to obtain an accurate anisotropy and to prevent short-circuiting in the lateral direction.

Here, with respect to techniques for controlling the arrangement of fine particles, techniques such as an electrostatic powder coating method, which comprises forming a coated film by charged fine particles in a state where electric lines of force are formed between the discharging portion of the corona discharge gun or tribo-gun and a target to be coated, have been known.

However, even if charged fine particles are sprayed on fine electrodes by using the corona discharge gun or the tribo-gun, it is difficult to provide accurate control of the arrangement, and even with the application of these techniques, it is difficult to accurately control the arrangement of spacers in manufacturing liquid crystal displays and to manufacture anisotropic conductive films with high performances.

SUMMARY OF THE INVENTION

The objective of the present invention is to solve the above-mentioned problems, thus to provide a fine particle arranging method in which the arrangement of fine particles can be accurately controlled, a liquid crystal display and an anisotropic conductive film which are obtained by using said method.

The first invention is a fine particle arranging method which comprises arranging charged fine particles on a surface of an object, wherein areas having a relatively high electric potential (+(positive)) and areas having a relatively low electric potential (−(negative)) are alternately formed on said surface of the object, electric lines of force are formed based upon the areas having the relatively high electric potential (+(positive)) and the areas having the relatively low electric potential (−(negative)), and the fine particles are arranged at relatively +(positive) bottom (1) positions and/or relatively −(negative) bottom (2) positions of said electric lines of force.

The second invention is a fine particle arranging method which comprises arranging fine particles on portions other than the electrodes on the surface of an object by spraying charged fine particles on the object constituted by aligning plural electrodes on the surface thereof, wherein spraying said fine particles is carried out while areas having a relatively high electric potential (+(positive)) and areas having a relatively low electric potential (−(negative)) are alternately formed on said electrode by applying voltages having different voltage values onto the plural aligned electrodes, and applying said voltages having different voltage values is carried out based upon a constant application pattern in which at least one of a relatively +(positive) bottom (1) position and a relatively −(negative) bottom (2) position of electric lines of force is made coincident with a gap position between said plural electrodes, said electric lines of force being formed based upon the voltages having different voltage values applied to the plural electrodes.

The third invention is a fine particle arranging method which comprises arranging fine particles on electrodes by spraying charged fine particles on an object constituted by aligning plural electrodes on the surface thereof, wherein spraying said fine particles is carried out while areas having a relatively high electric potential (+(positive)) and areas having a relatively low electric potential (−(negative)) are alternately formed by applying voltages having different voltage values onto the plural aligned linear electrodes, and applying the voltages having different voltage values is carried out based upon a constant application pattern in which at least one of a relatively +(positive) bottom (1) position and a relatively −(negative) bottom (2) position of electric lines of force is made coincident with a position on said electrode, said electric lines of force being formed based upon the voltages having different voltage values applied to plural electrodes.

Figure 1:
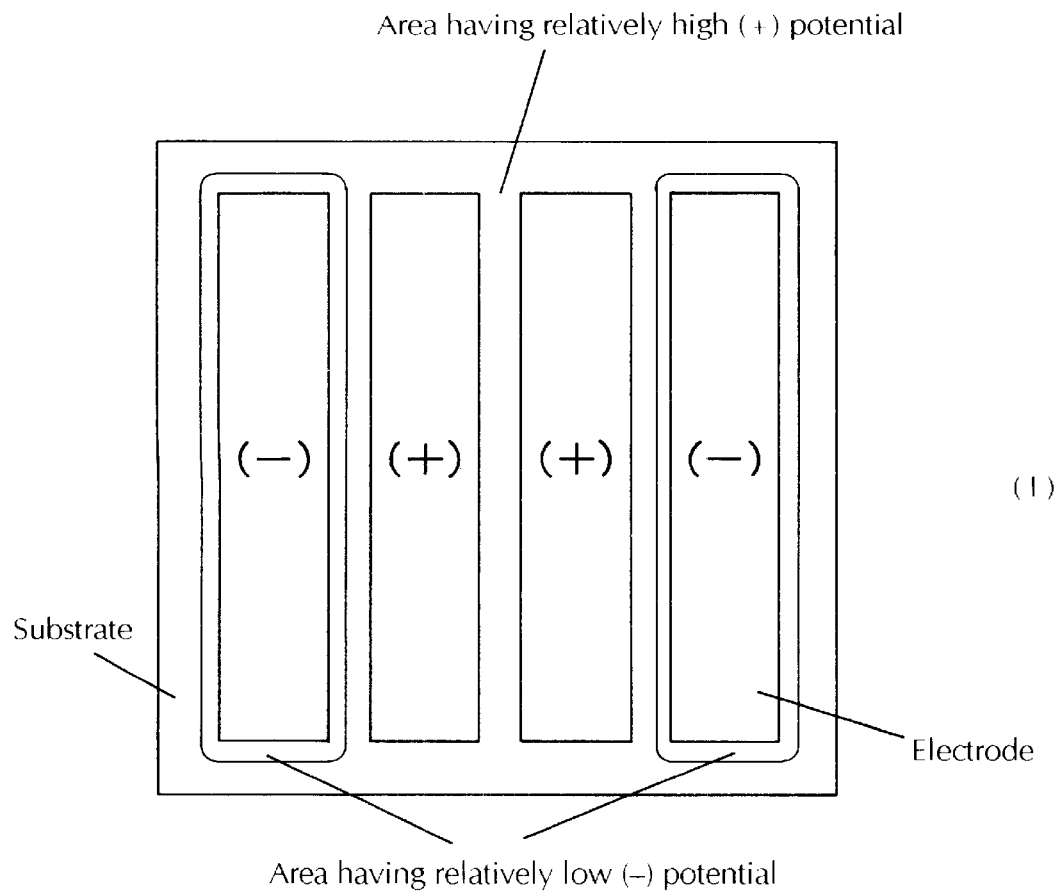
FIG. 1 is a conceptual drawing that explains a fine particle arranging method of the present invention.
Figure 1:
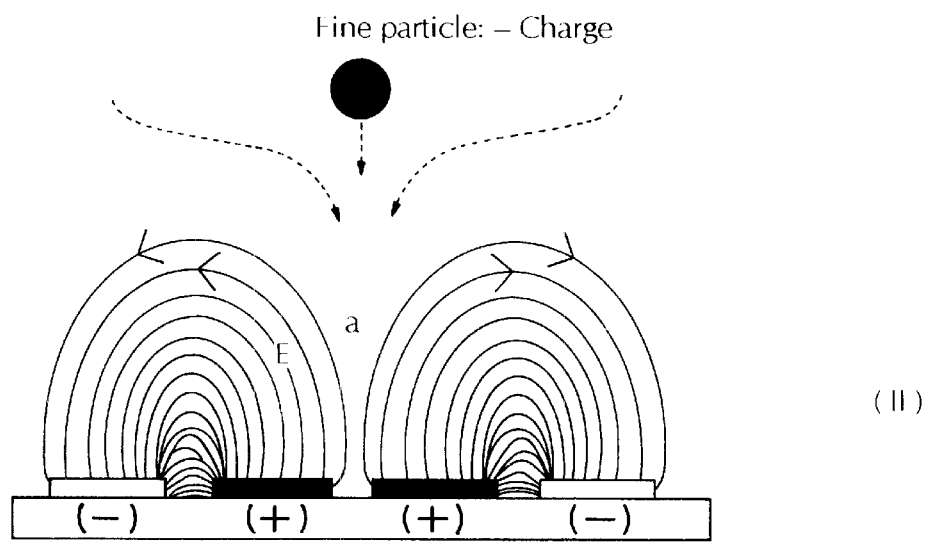

| EXPLANATION OF THE REFERENCE NUMERALS | |
|---|---|
| 1 | substrate |
| 2 | polarizing plate |
| 3 | transparent electrode |
| 4 | color filter |
| 5 | black matrix |
| 6 | overcoat |

| -continued | |
|---|---|
| EXPLANATION OF THE REFERENCE NUMERALS | |
| 7 | liquid crystal |
| 8 | spacer |
| 9 | alignment film |
| 10 | container main body |
| 11 | spacer discharging tube |
| 12 | voltage applying device |

DETAILED DESCRIPTION OF THE INVENTION

The following description will discuss the present invention in detail.

The first invention is a fine particle arranging method which comprises arranging charged fine particles on a surface of an object, wherein areas having a relatively high electric potential (+(positive)) and areas having a relatively low electric potential (−(negative)) are alternately formed on the surface of said object, electric lines of force are formed based upon the areas having the relatively high electric potential (+(positive)) and the areas having the relatively low electric potential (−(negative)), and the fine particles are arranged at a relatively +(positive) bottom (1) position and/or a relatively −(negative) bottom (2) position of said electric lines of force.

The first invention is a fine particle arranging method which comprises arranging charged fine particles on a surface of an object.

With respect to the fine particles used in the first invention are not particularly limited, there can be mentioned, for example, synthetic resin fine particles, inorganic fine particles, fine particles comprising a synthetic resin with a pigment dispersed therein, fine particles colored by a dye, and fine particles bonded by heat, light, etc. Moreover, the shape of the above-mentioned fine particles is not particularly limited, and for example, a spherical shape and a polygonal shape are mentioned. The particle size of the above-mentioned fine particles is not particularly limited, and in the case of spherical fine particles, those having a size approximately in the range of 0.1 $\mu$m to several hundreds $\mu$m can be used.

The method for charging the above-mentioned fine particles is not particularly limited, but there can be mentioned a method, for example, which comprises blowing out fine particles through a pipe, orifice, tube, etc. composed of metal, resin, etc. by using compressed air, nitrogen gas, etc. The fine particles thus blown out are charged by repeating contacts (collisions) against the pipe walls. Moreover, there can be mentioned a method which comprises stirring iron powder carrier, etc. to be charged, and then blowing out.

The object of the first invention is a target object on the surface of which fine particles are arranged. Said object is not particularly limited, and for example, those comprising synthetic resin, metal, etc. are used. The surface shape of the object is not particularly limited, and for example, a flat face and a non-flat face such as a curved face and a concavo-convex face, can be mentioned.

Moreover, in order to form areas having a relatively high electric potential (+(positive)) and areas having a relatively low electric potential (−(negative)), a thin-film electrode pattern may be formed on the surface thereof. Furthermore, a conductive member, etc. may be embedded in the surface of the object. In this case, the shape of the thin-film electrode or the conductive member is not particularly limited, but there can be mentioned, for example, a striped shape having stripes aligned therein, a lattice shape, a round shape, a wave shape, etc.

The fine particle arranging method of the first invention is a method which comprises controlling and arranging the fine particles on the surface of an object by alternately forming areas having a relatively high electric potential (+(positive)) and areas having a relatively low electric potential (−(negative)).

In order to form a pattern having such areas, for example, voltages having different voltage values are applied onto a plurality of linear electrodes aligned in parallel with each other based upon a constant application pattern. This constant application pattern is formed by at least three electrodes. If only two electrodes are provided, electric lines of force are only formed from the electrode charging relatively +(positive) toward the electrode charging relatively −(negative), therefore, charged fine particles are arranged over the entire surface of either of the electrodes, thereby failing to control the arrangement of the fine particles. In the first invention, at least one of the areas having a relatively high electric potential (+(positive)) and the areas having a relatively low electric potential (−(negative)) can be formed by applying a voltage to the conductive member. In other words, a plurality of conductive members are formed on the surface of the object and different voltages are applied to the respective conductive members.

In the first invention, at least one of the areas having a relatively high electric potential (+(positive)) and the areas having a relatively low electric potential (−(negative)) maybe formed by static electricity, and for example, frictional static charge, etc. by using objects belonging to different static charge series may be used to form these areas.

In the first invention, at least one of the areas having a relatively high electric potential (+(positive)) and the areas having a relatively low electric potential (−(negative)) are also formed by means of electrostatic induction or dielectric polarization. When a method which comprises applying a voltage to the conductive member, a method which comprises using static electricity, a method which comprises using electrostatic induction or dielectric polarization, and a method which comprises using striped electrodes constituted by linear electrodes, as will be described later, are adopted, two or more kinds of them may be used in a shared manner.

When the areas having a relatively high electric potential (+(positive)) and the areas having a relatively low electric potential (−(negative)) are alternately formed on the surface of an object, electric lines of force are formed due to the difference in electric potential. When charged fine particles having a particle size of several $\mu$m to several tens $\mu$m, such as spacers, are placed in an electric field having such electric lines of force, these fine particles are subjected to force by the electric lines of force. Since the electric lines of force form relatively +(positive) bottoms (1) and/or relatively −(negative) bottoms (2), the above-mentioned fine particles are arranged at these positions of the relatively +(positive) bottoms (1) and/or the relatively −(negative) bottoms (2) depending on relative polarities of their charge.

The fine particle arranging method of the first invention, which is designed as described above, makes it possible to accurately arrange fine particles on the surface of an object.

The second invention is a fine particle arranging method which comprises arranging fine particles on portions other than the electrodes on the surface of an object by spraying charged fine particles on the object constituted by aligning plural electrodes on the surface thereof, wherein spraying said fine particles is carried out while areas having a relatively high electric potential (+(positive)) and areas having a relatively low electric potential (−(negative)) are alternately formed on said electrodes by applying voltages having different voltage values onto a plurality of arranged electrodes, applying the voltages having different voltage values is carried out based upon a constant application pattern in which at least one of a relatively +(positive) bottom (1) position and a relatively −(negative) bottom (2) position of electric lines of force is made coincident with a gap position between plural electrodes, said electric lines of force being formed based upon the voltages having different voltage values applied to the plural electrodes.

The fine particle arranging method of the second invention is a method which comprises arranging fine particles on portions other than the electrodes on the surface of an object by spraying charged fine particles on an object composed of a plurality of electrodes aligned on the surface thereof.

With respect to the object, fine particles, the method for charging the fine particles and the method for alternately forming the areas having a relatively high electric potential (+(positive)) and the areas having a relatively low electric potential (−(negative)) of the second invention, those explained in the first invention can be adopted in the same manner.

The electrodes used in the second invention are not particularly limited, and for example, linear electrodes, etc. may be used. Moreover, striped electrodes composed of those linear electrodes aligned in parallel with each other may be formed on the object.

The method for spraying the above-mentioned fine particles is not particularly limited, but there can be mentioned, for example, a method which comprises discharging fine particles through a pipe, orifice, tube, etc. composed of metal, resin, etc. by using compressed air, nitrogen gas, etc.

In general, when two kinds of voltages having different voltage values are respectively applied to two electrodes formed on a plane surface, areas having a relatively high electric potential (+(positive)) and areas having a relatively low electric potential (−(negative)) are formed. Electric lines of force are formed by the difference in these electric potentials. In other words, even in the case that both of the voltages to be applied to the two electrodes have the same polarity with respect to earth electric potential (ground electric potential) as a reference (0), when there is an electric potential difference between the voltages applied to the two electrodes, one of the electrodes becomes relatively +(positive) so that areas having a relatively high electric potential (+(positive)) are formed, and the other electrode becomes relatively −(negative) so that areas having a relatively low electric potential (−(negative)) are formed. In this case, the electric lines of force are formed from the electrode that is relatively +(positive) toward the electrode that is relatively −(negative). In the case that charged particles are placed in an electric field having such electric lines of force, if they are +(positively) charged, they are subjected to a force in the direction of the electric lines of force, and if they are −(negatively) charged, they are subjected to a force in a direction reversed to the direction of the electric lines of force.

In the fine particle arranging method of the second invention, voltages having different voltage values are applied to the above-mentioned plural aligned electrodes so that, of those plural electrodes, electrodes having a relatively high electric potential (+(positive)) and electrodes having a relatively low electric potential (−(negative)) are formed; thus, as illustrated in (I) of FIG. 1, areas having a relatively high electric potential (+(positive)) and areas having a relatively low electric potential (−(negative)) are alternately formed on said plural electrodes. Here, with respect to the voltages having different voltage values, two kinds, or three kinds or more voltages, may be used. If there are not less than three kinds of voltages having different values, it becomes difficult to form an electrode pattern; therefore, two kinds of voltages having different voltage values are preferably used. Moreover, the kinds of voltage to be applied to the electrodes is not particularly limited, and for example, a voltage such as a DC voltage and a pulse voltage is preferably used. Moreover, the above-mentioned plural electrodes may be provided as striped electrodes formed by arranging linear electrodes with constant intervals.

As illustrated in (I) of FIG. 1, when an area having a relatively low electric potential (−(negative)), an area having a relatively high electric potential (+(positive)), an area having a relative relatively high electric potential (+(positive)) and an area having a relatively low electric potential (−(negative)) are alternately formed on striped electrodes composed of four linear electrodes, electric lines of force, shown in (II) of FIG. 1, are formed on the striped electrodes. In the present invention, the application of the voltages is carried out based upon a constant application pattern in which at least one of a relatively +(positive) bottom (1) position and a relatively −(negative) bottom (2) position of the above-mentioned electric lines of force formed as mentioned above is made coincident with a gap position between said plural linear electrodes. Here, the relatively +(positive) bottom (1) refers to a bottom a in (II) of FIG. 1. In (II) of FIG. 1, the relatively +(positive) bottom (1) is made coincident with a gap position between said plural linear electrodes. In this case, supposing that the electrodes charging relatively +(positive) are indicated by "+" and the electrodes charging relatively −(negative) are indicated by "−" the above-mentioned constant application pattern is represented by −++−

In the case that the fine particles to be sprayed are −(negatively) charged, since they are subjected to a force in the direction reversed to that of said electric lines of force, the fine particles are arranged at the relatively +(positive) bottom (1), that is, at the gap between the relatively +(positive) electrodes, in a line shape. Here, in the case that the fine particles are relatively +(positively) charged, the same effect can be obtained by reversing the relatively +(positive) electrodes and the relatively −(negative) electrodes.

Supposing that the fine particles are −(negatively) charged, that linear electrodes having the same width are arranged with constant intervals so that striped electrodes are formed, and that the even number of relatively +(positive) electrodes are continuously arranged, that is, for example, the constant application pattern is indicated by , ++−++−++− . . . , ++−−++−−++−− . . . , −−++++−−++++−− . . . , etc., the continuously arranged relatively +(positive) electrodes form an area having a relatively high electric potential (+(positive)), and the continuously arranged relatively −(negative) electrodes form an area having a relatively low electric potential (+(negative)), with the result that since the relatively +(positive) bottom (1) is made coincident with a gap position of the even number of the relatively +(positive) electrodes, the fine particles are arranged at the gap between the even number of relatively +(positive) electrodes.

With respect to the relationship between the charged particles and the voltage polarities giving an electric potential difference, provision is made so as to maintain the magnitude relationship between the voltage values forming the relatively high +(positive) electric potential and the voltage values forming the relatively low −(negative) electric potential, and the polarities of the voltage values giving a relatively high electric potential +(positive) and a relatively low electric potential −(negative) may be +(positive) and −(negative), or both of them may be +(positive), or both of them maybe −(negative). Moreover, either of them may be set to earth electric potential. For example, when the fine particles are −(negatively) charged, both of the voltage polarities giving the electric potential difference may be −(negative). In this case, although the number of fine particles to reach the substrate tends to decrease slightly; the fine particles are arranged without being subjected to repulsion due to the influence of the electric lines of force. Even in the case of the fine particles +(positively) charged, the voltage polarities do not matter as long as the magnitude relationship between the voltage values is maintained in the same manner. These voltage application conditions are appropriately determined depending on factors such as the gap between the electrodes to be used and the quantity of charge of the fine particles.

In the relationship in which the electric potential between the electrodes arranging the fine particles have a polarity reversed to the charging polarity of the fine particles, when the electric potential difference is further increased so that the fine particles are more effectively made coincident with the electric lines of force, the positioning property may be improved in some cases.

Moreover, in the relationship in which the electric potential of the electrodes is the same as the charging polarity of the fine particles, it is possible to improve the positioning property in some cases. For example, even in the case that the charging polarity of the fine particles is −(negative), it is better for the positioning property to form an electric potential difference of 100 V by using voltages from −1100 to −1000 V with the same polarity as the charging polarity of the fine particles than to form the electric potential difference of 100 V by using voltages from 0 to +100 V. This is because in the case that the electric potential difference is formed by using the reversed charging polarity of the fine particles, the fine particles is first subjected to the pull of gravity in the distance from the substrate so that their falling speed tends to increase, while in the case that the electric potential difference is formed by using the same charging polarity as the fine particles, their falling speed tends to decrease due to the repulsive force, with the result that the inertial force exerting on the fine particles varies so that the behavior of aligning the fine particles with the electric lines of force is allowed to change.

The fine particle arranging method of the second invention, which is designed as described above, makes it possible to accurately arrange fine particles on the surface of an object.

Here, the electrodes used in the present invention are not limited to linear electrodes, and those electrodes of the picture character display type, etc. may be adopted.

The third invention is a fine particle arranging method which comprises arranging fine particles on electrodes by spraying charged fine particles on an object constituted by aligning plural electrodes on the surface thereof, wherein spraying said fine particles is carried out while areas having a relatively high electric potential (+(positive)) and areas having a relatively low electric potential (−(negative)) are alternately formed by applying voltages having different voltage values onto the plural arranged electrodes, the applying the voltages having different voltage values on said electrodes is carried out based upon a constant application pattern in which at least one of a relatively+(positive) bottom (1) position and a relatively −(negative) bottom (2) position of electric lines of force is made coincident with a position on each electrode, said electric lines of force are formed based upon the voltages having different voltage values applied to said plural electrodes.

The fine particle arranging method of the third invention is the arranging method which comprises arranging fine particles on electrodes by spraying charged fine particles on an object constituted by aligning plural electrodes on the surface thereof. With respect to the position on which the fine particles are arranged, it is not necessarily the entire surface of the electrode, and may be only a specific portion on the surface of said electrode.

In the third invention, with respect to the object, fine particles, the method for charging the fine particles and the method for alternately forming the areas having a relatively high electric potential (+(positive)) and the areas having a relatively low electric potential (−(negative)), there can be mentioned the same as explained in the first and second inventions.

With respect to the electrodes of the third invention, the same electrodes as explained in the second invention can be mentioned.

With respect to the spraying methods of the fine particles of the third invention, there can be mentioned the same methods as explained in the second invention.

Figure 2:
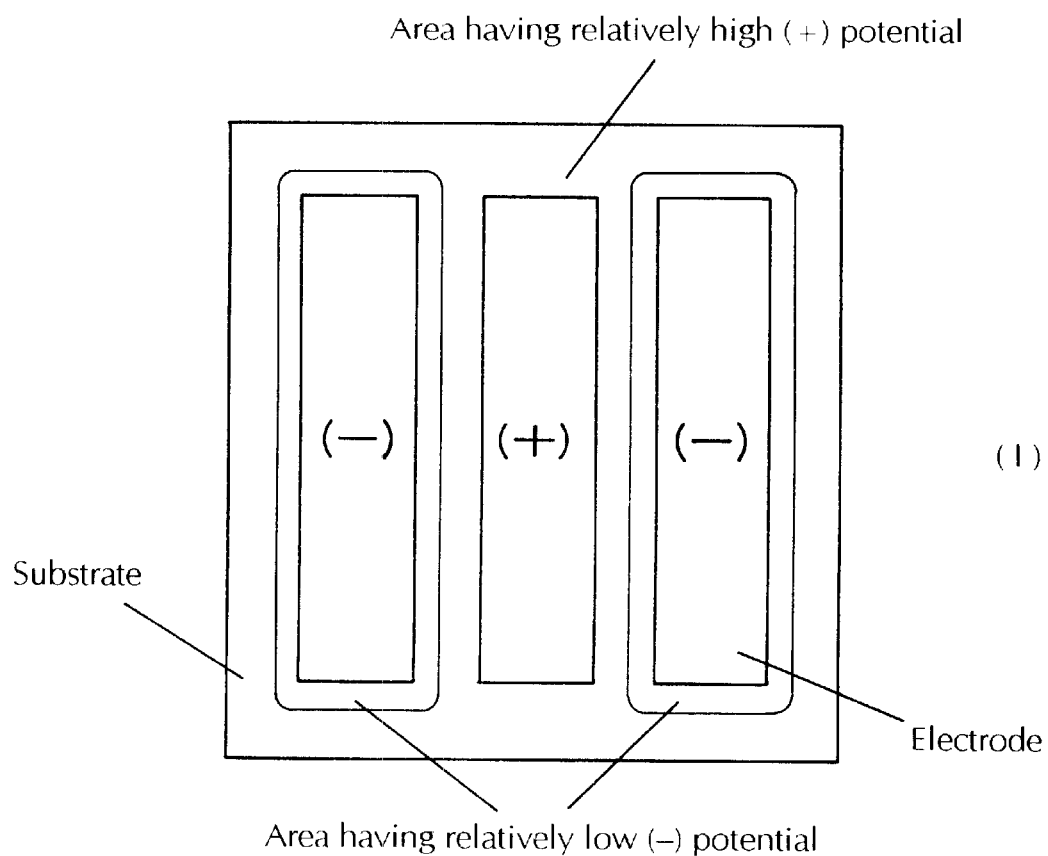
FIG. 2 is a conceptual drawing that explains the fine particle arranging method of the present invention.
Figure 2:
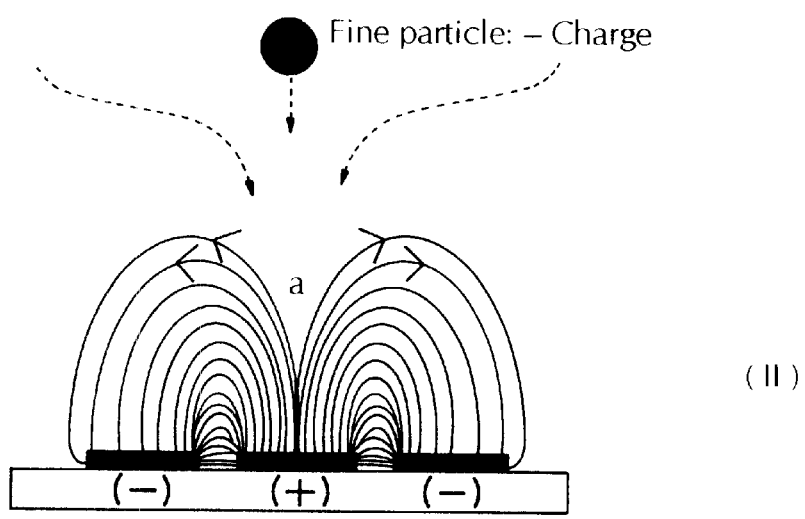

In the fine particle arranging method of the third invention, voltages having different voltage values are applied to the above-mentioned plural aligned electrodes so that, of those electrodes, electrodes having a relatively high electric potential (+(positive)) and electrodes having a relatively low electric potential (−(negative)) are formed; thus, as illustrated in (I) of FIG. 2, areas having a relatively high electric potential (+(positive)) and areas having a relatively low electric potential (−(negative)) are alternately formed. Here, with respect to the number of voltages having different voltage values, the kinds of the voltage to be applied to the electrodes, and the plural electrodes mentioned above are the same as those explained in the second invention.

As illustrated in (I) of FIG. 2, when an area having a relatively low electric potential (−(negative)), an area having a relatively high electric potential (+(positive)) and an area having a relatively low electric potential (−(negative)) are alternately formed on striped electrodes composed of three linear electrodes, electric lines of force, shown in (II) of FIG. 2, are formed on the striped electrodes. In the present invention, the application of the voltages having different voltage value is carried out based upon a constant application pattern in which at least one a relatively +(positive) bottom (1) position and a relatively −(negative) bottom (2) position of the above-mentioned electric lines of force is made coincident with a gap position between the plural linear electrodes. Here, the relatively +(positive) bottom (1) refers to a bottom a in (II) of FIG. 2. In (II) of FIG. 2, the relatively +(positive) bottom (1) is made coincident with a position on said plural linear electrodes. In this case, the above-mentioned constant application pattern is represented by −+−.

In the case that the fine particles to be sprayed are −(negatively) charged, since they are subjected to a force in the direction reversed to that of the electric lines of force, the fine particles are arranged at the relatively +(positive) bottom (1), that is, on the electrode charging relatively +(positive) in a line shape. Here, in the case that the fine particles are relatively+(positively) charged, the same effect can be obtained by reversing the relatively +(positive) electrodes and the relatively −(negative) electrodes.

Supposing that the fine particles are −(negatively) charged, that linear electrodes having the same width are aligned with constant intervals so that striped electrodes are formed, and that the odd number of relatively +(positive) electrodes are continuously aligned, for example, the constant application pattern is indicated by, −−+−−+−− . . . +++−+++− . . . , etc., the relatively +(positive) bottom (1) is coincident with a position of an electrode located in the center of the odd number of the relatively +(positive) electrodes, with the result that the fine particles are arranged in the center of this electrode in a line shape.

The fine particle arranging method of the third invention, which is designed as described above, makes it possible to accurately arrange fine particles on the surface of an object.

In the second invention and the third invention, in the case that the widths of the linear electrodes are not equal, for example, when the constant application pattern is indicated by: ++−++−++− . . . , ++−−++−− . . . , ++++−−++++−− . . . , etc., those aligned electrodes charging relatively +(positive) are allowed to form an area having a relatively high electric potential (+(positive)), and those aligned electrodes charging relatively −(negative) are allowed to form an area having a relatively low electric potential (−(negative)) in the same manner as the electrodes having the same width; therefore, as a whole, the area having a relatively high electric potential (+(positive)) and the area having a relatively low electric potential (−(negative)) are alternately arranged. However, in this case, the relatively +(positive) bottom (1) in the electric lines of force is not necessarily formed in the center position of the area having a relatively high electric potential (+(positive)); and the bottom position of the electric lines of force varies depending on the degree of difference in the electrode width, the relationship with the electrode intervals at the time in question, the regularity of the electrode widths, etc. Therefore, even in the case of the odd number of aligned electrodes charging relatively +(positive), the −(negatively) charged fine particles can be placed at a position without any electrode by adjusting the electrode width, the electrode interval, the voltage application method, etc. In contrast, even in the case of the above-mentioned constant application pattern (even number of +), the −(negatively) charged fine particles can be placed on the electrode.

Moreover, in the case that, although the linear electrodes have the same width, they are not arranged with the same interval, the position of the bottom of the electric lines of force varies depending on the degree of difference in the interval, the regularity of the intervals, etc. Therefore, the electrode interval or the arrangement on the electrode can be determined by taking these factors into consideration.

Furthermore, for example, when voltages, such as −100 V, +300 V and −200 V, are applied to three linear electrodes, the relatively+(positive) bottom (1) of the electric lines of force is formed at a position in the vicinity of a ⅓ of the center electrode, with the result that when −(negatively) charged fine particles are allowed to drop thereon, the fine particles are arranged on the corresponding position. For example, when voltages, such as −100 V, +100 V, +100 V, +100 V and −200 V, are applied to five linear electrodes having a specific width and a interval, the relatively +(positive) bottom (1) of the electric lines of force is formed in the vicinity of the interval between the second and third electrodes, with the result that fine particles are arranged on the corresponding position.

The fine particle arranging methods of the first, the second and the third inventions are preferably applied to the manufacturing method of liquid crystal displays. In other words, liquid crystal displays can be obtained by spraying spacers by using the fine particle arranging method of the first, the second or the third invention.

In general, a liquid crystal display is manufactured by spraying spacers on a first substrate having striped transparent electrodes constituted by arranging a plurality of linear transparent electrodes in parallel with each other, placing a second substrate on the first substrate so as to face it, and injecting liquid crystal to the gap between them. A liquid crystal display of the present invention 2 is obtained by applying the fine particle arranging method of the present invention 1 to spraying spacer on the first substrate having the above-mentioned striped transparent electrodes.

The liquid crystal display is, for example, manufactured in the following processes.

Figure 3:
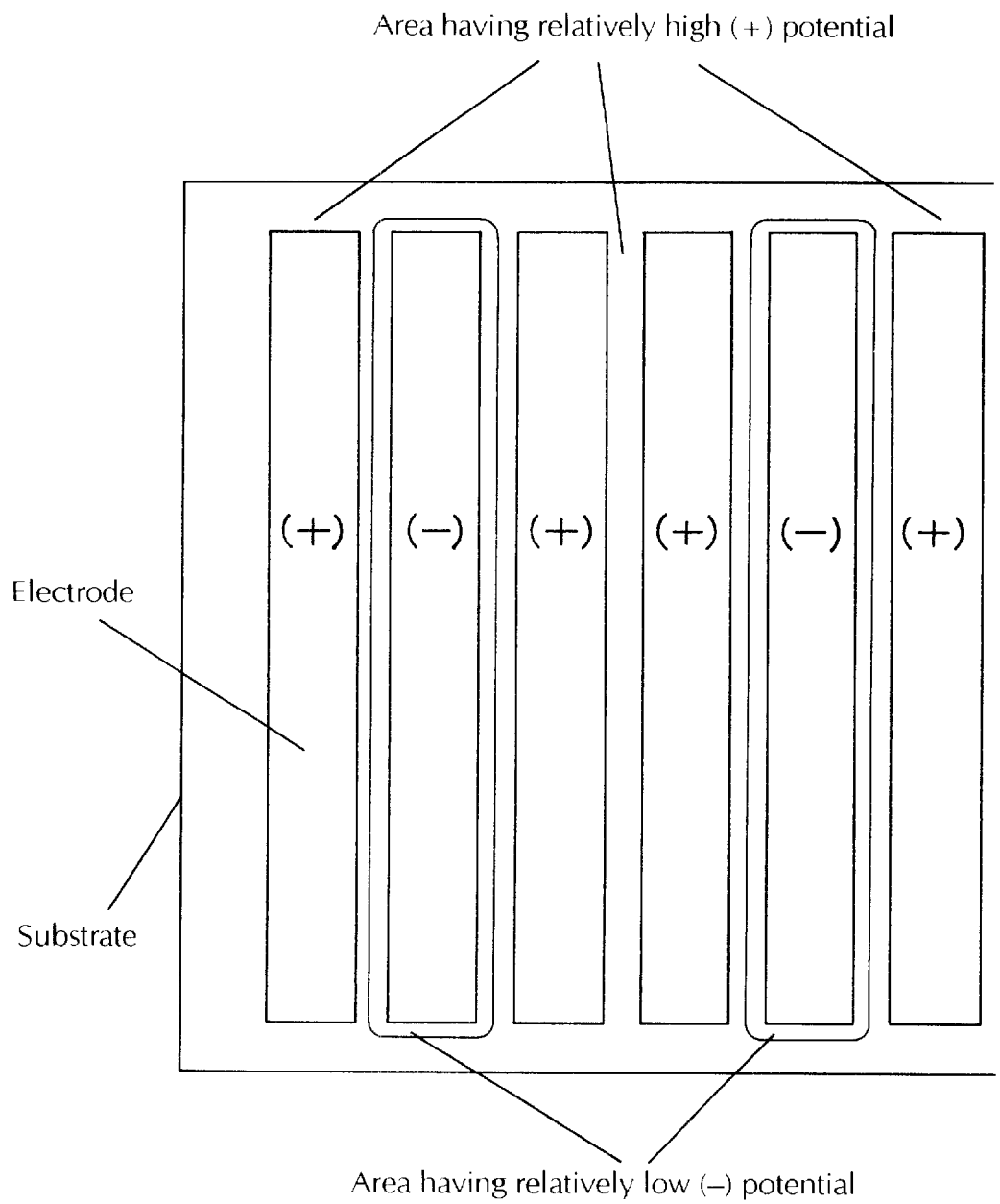
FIG. 3 is a conceptual drawing that shows areas having a relatively high electric potential (+(positive)) and areas having a relatively low electric potential (−(negative)) formed on striped transparent electrodes, when viewed from above the striped transparent electrodes.

Voltages having different voltage values are applied on a plurality of linear transparent electrodes arranged with constant intervals to constitute striped transparent electrodes on the first substrate, so that, in the above-mentioned plural linear transparent electrodes, those electrodes charging relatively +(positive) and those electrodes charging relatively −(negative) are formed; thus, as illustrated in FIG. 3, areas having a relatively high electric potential (+(positive)) and areas having relatively low electric potential (−(negative)) are alternately formed on the striped transparent electrodes constituted by the plural linear transparent electrodes.

Figure 4:
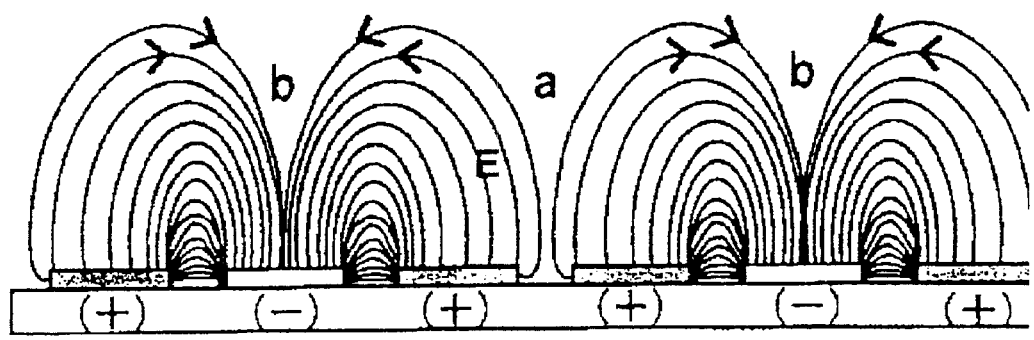
FIG. 4 is a conceptual drawing that shows electric lines of force formed by those areas having an electric potential difference as shown in FIG. 3, when viewed from above the striped transparent electrodes.

In this case, the areas having the electric potential differences shown in FIG. 3 form electric lines of force as illustrated in FIG. 4. In the present invention, the applying method of the voltages having different voltage values is carried out based upon a constant application pattern in which at least one of a relatively +(positive) bottom (1) and a relatively −(negative) bottom (2) of the electric lines of force as formed mentioned above is made coincident with a position of the gap between plural linear transparent electrodes mentioned above. Here, the relatively +(positive) bottom (1) refers to a bottom a in FIG. 4, and the relatively −(negative) bottom (2) refers to a bottom b in FIG. 4. In FIG. 4, the relatively +(positive) bottom (1) is made coincident with a position of the gap between the plural linear transparent electrodes mentioned above.

Figure 5:
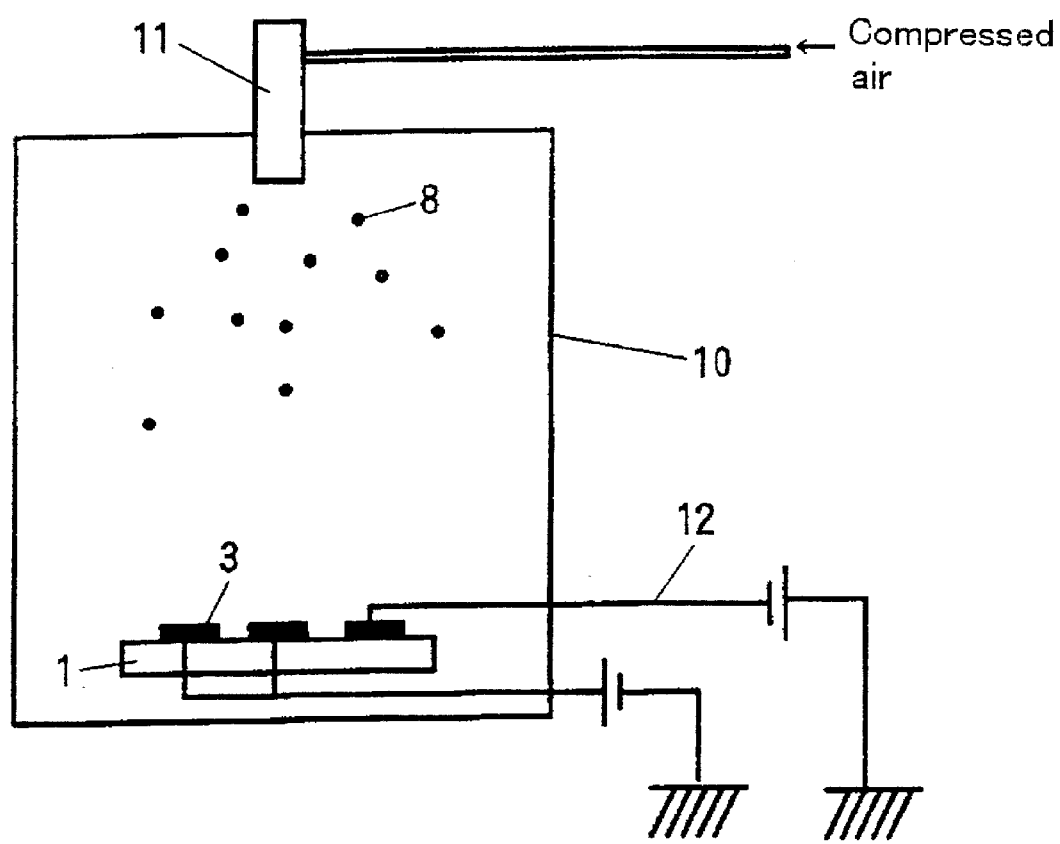
FIG. 5 is a conceptual drawing that explains one embodiment of a manufacturing method of a liquid crystal display of the present invention.

Generally, in the manufacturing process of the liquid crystal display, as illustrated in FIG. 5, spraying the spacer is carried out by spraying and scattering an appropriate amount of spacers on the substrate by means of compressed air, nitrogen, etc. As to the method for scattering the spacer, either a dry spraying method or a wet spraying method may be used. The wet spraying method comprises spraying the spacers by dispersing in a mixed solution such as water and alcohol, and in this case also, since the spacers are charged, the effects of the present invention are exerted without failure. However, since the greater the charging quantity of the spacers, the higher the arranging precision, the dry spraying method is preferably adopted. By the spraying process mentioned above, the spacers are charged while they repeat contacting (colliding) the piping walls.

Therefore, when sprayed spacers are −(negatively) charged, they are placed at the relatively +(positive) bottom (1), that is, at the gap between the plural linear transparent electrodes.

With respect to the spacers used in the above-mentioned liquid crystal display, there can be mentioned the same spacers as explained in the first, second and third inventions.

In the above-mentioned liquid crystal display, the substrate on which the spacers are sprayed may be a substrate with a color filter or a substrate opposing to the substrate in question.

In the case that the fine particle arranging methods of the first, second and third inventions are applied to the manufacturing method of a TFT-type liquid crystal display, striped electrodes are formed on a substrate on the color filter side, and the spacers are arranged between electrodes by utilizing these electrodes. In a general TFT-type liquid crystal display, flat electrodes are used on the color filter side substrate, and even in the case of using striped electrodes, the device can be driven in the same manner as the general TFT liquid crystal display by applying voltages having the same electric potential to the respective linear electrodes constituting the striped electrodes.

The following description will discuss embodiments of the above-mentioned liquid crystal display in detail.

Spacers can be sprayed on the gap between the adjacent two linear transparent electrodes applied the voltage having the reversed polarity thereto, for example, by carrying out spraying the spacers while applying a voltage having a polarity reversed to the charging polarity of the spacers and a voltage having the same polarity as the charging polarity of the spacers to a plurality of linear transparent electrodes aligned in parallel with each other, and applying the voltages having the reverse polarity and the same polarity by the method such that the voltage having the reversed polarity is applied to two linear transparent electrodes, the voltage having the same polarity is applied to one linear transparent electrode, and the voltages are applied to serve the arrangement of these adjacent three linear transparent electrodes as one unit of repetition.

When the above-mentioned spacers are composed of, for example, a synthetic resin, they are generally negatively charged by repeating contacts (collisions) against the piping walls during the spraying process. Therefore, when a negative voltage having the same polarity is applied to the transparent electrodes, the spacers are repulsed by a repulsive force with the result that they are sprayed on portions other than the transparent electrodes. In contrast, when a positive voltage having the reversed polarity is applied, the spacers are sprayed onto the transparent electrode by an attracting force in a concentrated manner.

In the striped transparent electrodes constituted by a plurality of the parallel aligned linear transparent electrodes, positive voltages or negative voltages are respectively applied to said plural linear transparent electrodes (for example, referred to as a1, a2, a3, a4, a5, a6 . . . ).

In the above-mentioned arrangement, when the negative voltage and the positive voltage are alternately applied to the plural linear transparent electrodes, the spacers are sprayed on the center of the width of the transparent electrode to which the positive voltage has been applied, due to duplicated functions of the repulsive force and attracting force.

Figure 6:
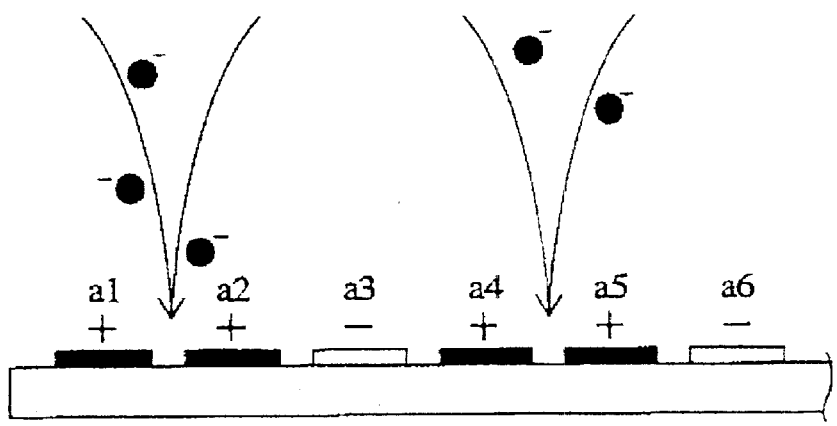
FIG. 6 is a conceptual drawing that explains an embodiment of a manufacturing method of a liquid crystal display of the present invention.

Here, as illustrated in FIG. 6, when the respective applications are carried out so that a set of two positive voltages (+) and one negative voltage (−) is repeated, that is, in a manner so as to apply a positive voltage to a1, a positive voltage to a2, a negative voltage to a3, a positive voltage to a4, a positive voltage to a5 and a negative voltage to a6, an electric field is formed between a1 and a2, between a4 and a5 . . . etc. (one of the reasons for which is the small size of the electrode interval between the respective transparent electrodes: approximately, 10 to 30 μm); therefore, the spacers are repulsed by a repulsive force from the negative voltage and also attracted by an attracting force from the positive voltage, as a result that those are accurately sprayed on the center portion between the positive voltage applied electrode and the positive voltage applied electrode. The center portion between the positive voltage applied electrode and the positive voltage applied electrode corresponds to the gap between the two adjacent linear transparent electrodes to which the voltage having the reversed polarity to the charging polarity of the spacers has been applied, that is, the portions other than the pixel electrode.

With the above-mentioned operation, it becomes possible to accurately spray the spacers between a1 and a2, between a4 and a5, . . . , etc., and also to set the spacers supplied to the same quantity between a1 and a2, between a4 and a5, . . . , etc.

In the above-mentioned operation, the spaying of the spacers is carried out between a1 and a2, between a4 and a5, . . . , etc. accurately in a uniform manner; however, with respect to the other gap portions such as, between a2 and a3, between a3 and a4, and between a5 and a6, it is not possible to spray the spacers.

For this reason, the applications of the reversed polarity and the same polarity are preferably carried out repeatedly so as to average the existence of the gap between the two linear transparent electrodes on which the spacers are sprayed with respect to the plural linear transparent electrodes.

Figure 7:
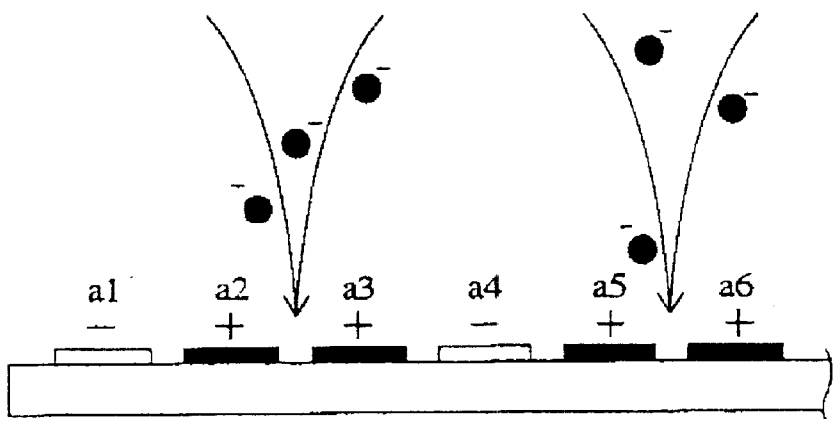
FIG. 7 is a conceptual drawing that explains an embodiment of a manufacturing method of a liquid crystal display of the present invention.

In other words, it is preferable to further spray the spacers after the above-mentioned operation while changing the combination of the positive voltage and negative voltage of the applied electrodes. More specifically, after the above-mentioned operation, as illustrated in FIG. 7, the respective applications are carried out so that a set of two positive voltages (+) and one negative voltage (−) is repeated, that is, in a manner so as to apply a negative voltage to a1, a positive voltage to a2, a positive voltage to a3, a negative voltage to a4, a positive voltage to a5 and a positive voltage to a6 . . . . Thus, it becomes possible to accurately spray the spacers between a2 and a3, between a5 and a6, . . . , etc.

Figure 8:
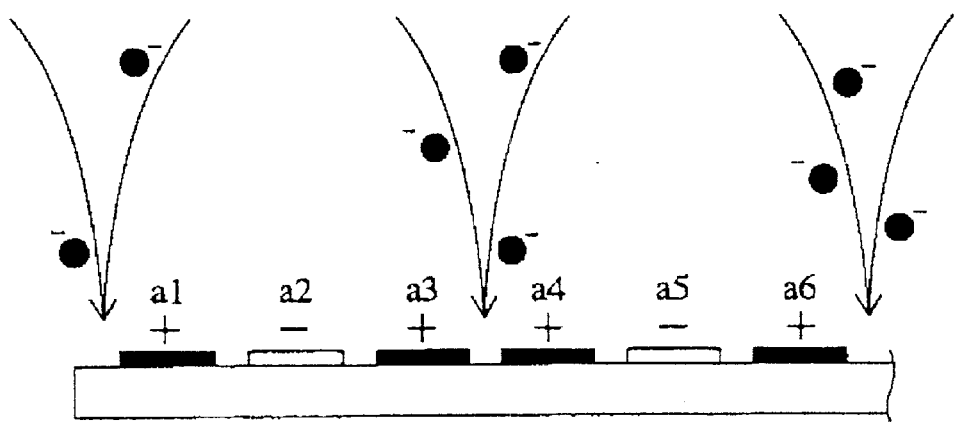
FIG. 8 is a conceptual drawing that explains an embodiment of a manufacturing method of a liquid crystal display of the present invention.

Moreover, it is preferable to spray the spacers while changing the combination of the positive voltage and negative voltage of the applied electrodes and then further to spray the spacers again while changing the combination of the positive voltage and negative voltage of the applied electrodes. More specifically, as illustrated in FIG. 8, the respective applications are carried out so that a set of two positive voltages (+) and one negative voltage (−) is repeated, that is, in a manner so as to apply a positive voltage to a1, a negative voltage to a2, a positive voltage to a3, a positive voltage to a4, a negative voltage to a5 and a positive voltage to a6 . etc. Thus, it becomes possible to accurately spray the spacers between a3 and a4, . . . , etc.

The above-mentioned two or three operations make it possible to place the spacers on the gap between the electrodes extremely accurately and uniformly.

In other words, the above-mentioned spraying method of the spacers uses the application methods of the voltages of the reversed polarity and the same polarity which take the following three methods:
(1) a repetition is made in the sequence of reverse polarity, reverse polarity and same polarity,
(2) a repetition is made in the sequence of reverse polarity, same polarity and reverse polarity, and
(3) a repetition is made in the sequence of same polarity, reverse polarity and reverse polarity.

The objective of the present invention is achieved by following any one of said methods. Moreover, by using at least two of the three sequences in an overlapped manner, it is possible to obtain better effects.

The liquid crystal display, obtained by using the fine particle arranging method of the first, second, or third invention, has the construction as described above; therefore, in the manufacturing process of the STN-type liquid crystal display also it is possible to remove of the pixel electrodes, and consequently to arrange the spacers on the black matrix portion. Therefore, it is possible to eliminate light leakage due to problems with the spacers, and to ensure very high contrast.

The fine particle arranging methods of the first invention, the second invention and the third invention are also applicable to the manufacturing method of anisotropic conductive films. In other words, spraying the conductive fine particles by the use of the fine particle arranging methods of the first invention, the second invention and the third invention, it is possible to obtain an anisotropic conductive film.

Figure 9:
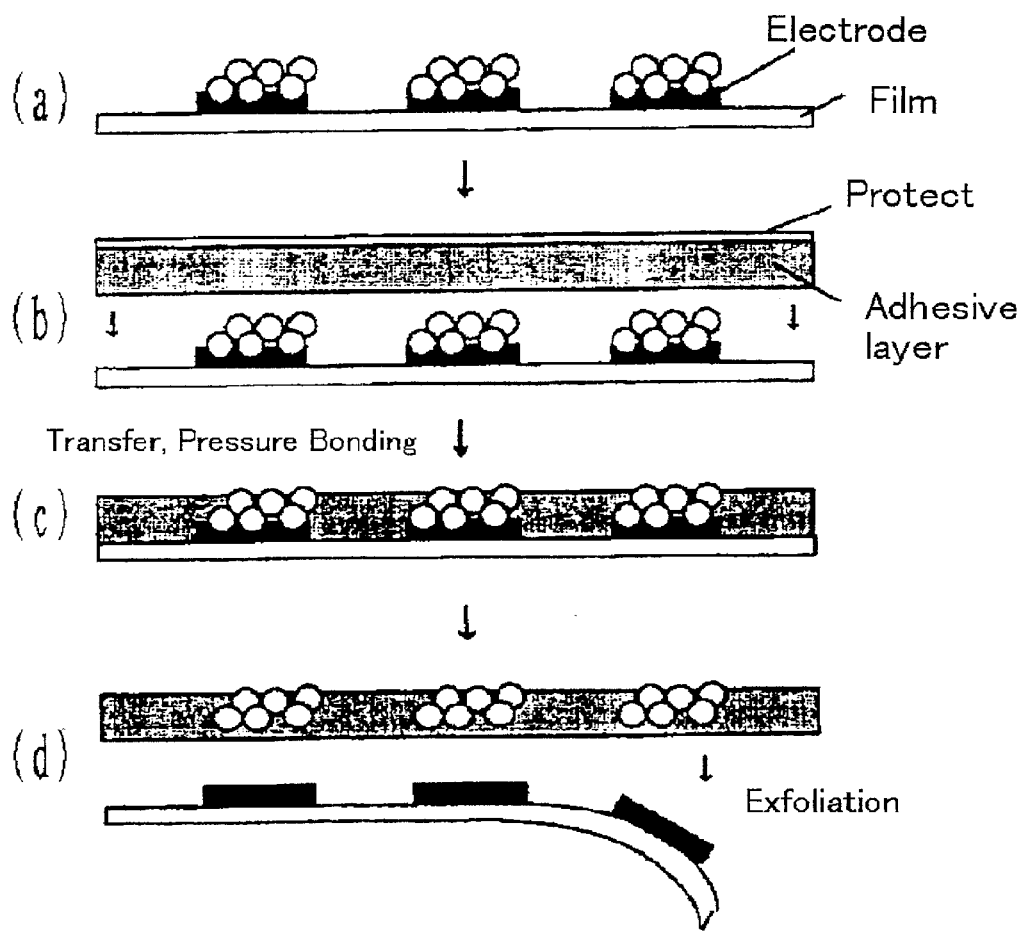
FIG. 9 is a conceptual drawing that explains one embodiment of a manufacturing method of an anisotropic conductive film of the present invention.

For example, the anisotropic conductive film is manufactured by using a method shown in FIG. 9.

First, conductive fine particles are arranged on an electrodes of a film on which electrodes are formed by using the fine particle arranging method of the first invention or the second invention (FIG. 9(*a*)). Here, the use of the fine particle arranging method of the first invention or the third invention also makes it possible to arrange the conductive fine particles on the portion without any electrodes.

With respect to the conductive fine particles, generally, fine particles coated with Au, Ni, etc. on the surface thereof are used. Even among metals, since their charging series is different depending on the kinds of metals, they can be charged in the same manner as the resin particles. For example, in the case that fine particles coated with Ni are sprayed by using SUS pipes, they are positively charged. Therefore, these particles can be selectively arranged on the gap between the electrodes or on the electrodes. Moreover, those particles coated with an insulating resin on the surface thereof can be used.

In the case of the conductive fine particles coated with an insulating resin, the fine particles exhibit functions as general conductive fine particles by fusing the insulating resin by heat at the final stage. The coating of the conductive fine particles by the use of the insulating resin is carried out by, for example, loading the conductive fine particles to a solution in which the above-mentioned insulating resin has been dissolved, stirring them, then taking out, drying and pulverizing.

Next, an adhesive layer is transferred, and press-bonded to a film on which the conductive fine particles have been arranged (FIG. 9(*b*), 9(*c*)). Further, an anisotropic conductive film is obtained by exfoliation of the film with electrodes being formed (FIG. 9(*d*)). With respect to the anisotropic conductive film thus formed, a plurality of them may be stacked. Moreover, this may be sliced at appropriate positions when used.

The anisotropic conductive film is not liable to short-circuiting in the lateral direction. Moreover, it is possible to obtain an anisotropic conductive film which locally allows conduction in the lateral direction by further increasing the density of the conductive fine particles to make the film conductive in the lateral direction.

The anisotropic conductive film obtained by using the fine particle arranging method of the first invention, the second invention or the third invention, which has the above-mentioned construction, has the conductive fine particles only on the electrode portions requiring conductivity.

BEST MODES FOR CARRYING OUT THE INVENTION

The present invention will be explained in more detail by means of examples; however, the present invention is not intended to be limited only by these examples.

EXAMPLE 1

Micropearl BB (Particle size; 5 μm Sekisui Fine Chemical K.K.) was used as fine particles. A spraying device as shown in FIG. 5 was used for dropping the fine particles onto an object. The fine particles of an appropriate amount was loaded into a diffuser, and diffused by compressed air of 1.5 kgf/cm$^2$ and sprayed onto the surface of the object. Here, this operation naturally allowed the fine particles to be −(negatively) charged. The spraying device was designed so that a DC voltage was to be applied from a voltage applying device into the main body thereof by using needle shaped electrode terminals. With respect to the object on which the fine particles were arranged, a glass substrate was prepared on which a ring pattern with four concentric circles, having an electrode width of 100 μm and an electrode interval of 20 μm, was formed with ITO. The circle in the center, composed of glass, had a diameter of 2 mm (these circles being referred to as A, B, C and D from the center).

A voltage of +100 V was applied to A and D from the needle shaped electrode terminals, and a voltage of +300 V was applied to B and C. Thus, electric lines of force were formed with a relatively + bottom in the shape of a circle between B and C.

When the fine particles were sprayed with this voltage state, the fine particles were arranged in the shape of a circle on the gap between B and C.

EXAMPLE 2

In Example 1, except that voltages of +100 V, +300 V and +100 V were respectively applied to A, B and C, the same operation as Example 1 was carried out. In this state, the electric lines of force were formed with a relatively + bottom centered on the B electrode width.

As a result, the fine particles were arranged in the shape of a circle along the center position of the B electrode width.

EXAMPLE 3

A plurality of striped electrodes having a width of 100 μm and a an interval of 100 μm were formed on a polyimide resin substrate by using ITO. The polyimide resin surface bearing the ITO electrodes was rubbed by a nylon brush so that the polyimide resin surface was negatively charged. Immediately after this process, a voltage of +500 V was applied to the respective ITO electrodes and fine particles were sprayed in the same manner as Example 1. In this state, electric lines of force were formed with a relatively + bottom on a position of the center of each ITO electrode width.

As a result, the fine particles were linearly arranged on the position of the center of each ITO electrode width.

EXAMPLE 4

A lattice pattern having an aperture section of 100×300 30 μm and a line width of 30 μm was formed on a glass substrate by using a Cr thin film. The substrate was subjected to closely contact a stage formed by Al, and a voltage of −500 V was applied to the Cr portion, while a voltage of +1 kV was applied to the Al stage. The glass portion was brought to the same state as if it was subjected to applying a + voltage due to dielectric polarization caused by the voltage of the Al stage. In this state, electric lines of force were formed with relatively + bottoms on a position of the center of the aperture portion from four sides.

In this state, the fine particles were sprayed in the same manner as Example 1.

As a result, the fine particles were linearly arranged in the center of the aperture section.

COMPARATIVE EXAMPLE 1

Two linear ITO electrodes were formed on a glass substrate with a width of 100 μm and an interval of 20 μm. A voltage of −100 V was applied to one of the electrodes and a voltage of +100 V was applied to the other electrode. In this state, electric lines of force were formed in a shape like a mountain connecting the two electrodes.

In this state, the fine particles were sprayed in the same manner as Example 1.

As a result, the fine particles were arranged on the entire surfaces of the two electrodes to which the voltage of +100 V was applied.

COMPARATIVE EXAMPLE 2

Two linear ITO electrodes were formed on a glass substrate with a width of 100 μm and a an interval of 20 μm. Voltages of +100 V were applied to the two electrodes. In this state, electric lines of force were supposedly formed in a shape like connecting the electrodes to distant places.

In this state, the fine particles were sprayed in the same manner as Example 1.

As a result, the fine particles were arranged on the entire surfaces of the two electrodes to which +100 V was applied and on the gap between the electrodes.

COMPARATIVE EXAMPLE 3

Two linear ITO electrodes were formed on a glass substrate with a width of 100 μm and a an interval of 20 μm. Voltages of −100 V were applied to the two electrodes. In this state, electric lines of force were supposedly formed in a shape like connecting the electrodes to distant places.

In this state, the fine particles were sprayed in the same manner as Example 1.

As a result, no fine particles were arranged on the surfaces of the two electrodes to which −100 V was applied and on the gap between the two electrodes. Here, the fine particles were repulsed, with the result that only few number of them were arranged on the substrates.

EXAMPLE 5

Copper wires having a diameter of 100 μm were secured and arranged onto a plurality of pieces of paper in parallel with each other with an interval of 100 μm and with respect to the copper wires thus arranged, voltages of +200 V were applied to two copper wires and voltages of −200 V were applied to the next two copper wires in succession, and this set of processes was successively repeated. In this state, electric lines of force were supposedly formed with a + bottom between two wires to which the voltages of +200 V were applied.

In this state, the fine particles were sprayed in the same manner as Example 1.

After the spraying process, the wires were removed, and the pieces of paper were observed. The results showed that the fine particles were arranged only the gap between the wires to which the voltages of +200 V were applied.

EXAMPLE 6

Figure 10:
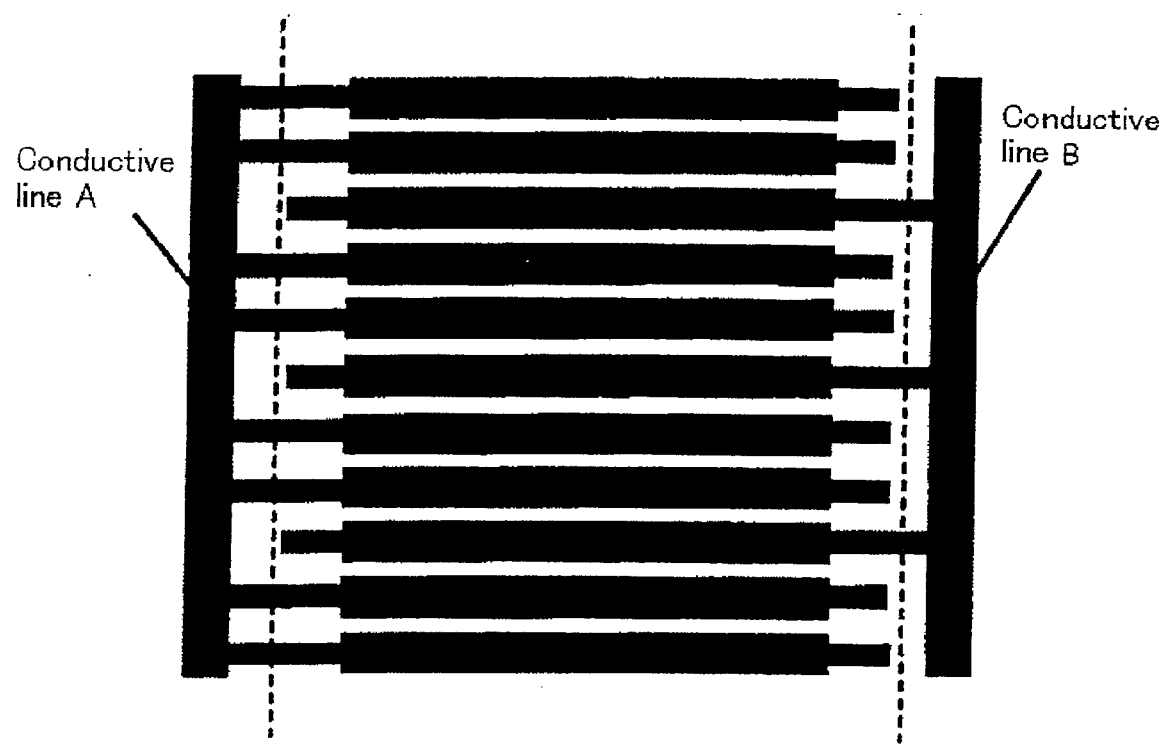
FIG. 10 is a schematic drawing of a comb-shaped electrode used in the Examples.
Figure 11:
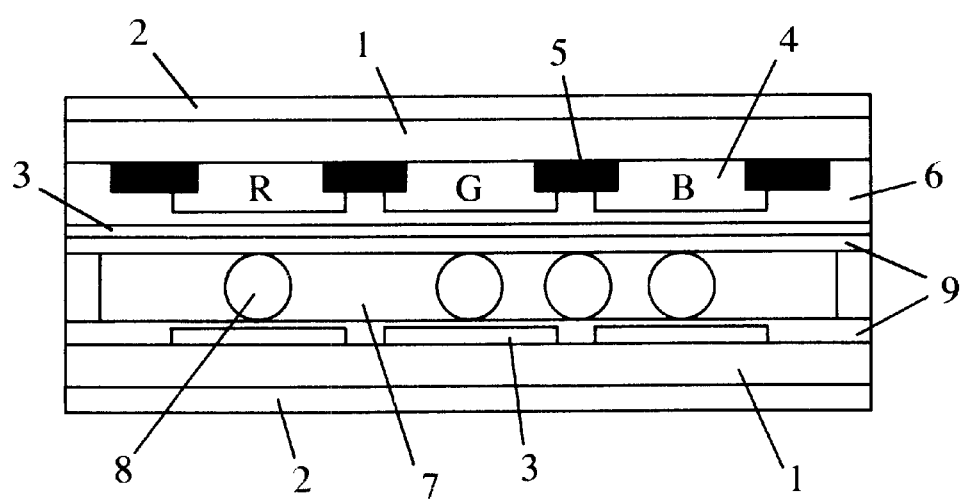
FIG. 11 is a conceptual cross-sectional view that shows a conventional liquid crystal display.

Common electrodes for use in an STN-type liquid crystal display (a color filter formation substrate having an aperture section of 80×285 µm for each of the pixels RGB (Red, Green and Blue), a width of a black matrix line of 20 µm, an ITO electrode width of 290 µm, an electrode interval of 15 µm and a plate thickness of 0.7 mm) were allowed to conduct outside the range of the display device so as to form comb-shaped electrodes of 2:1 as illustrated in FIG. 10; thus, a substrate was formed.

A polyimide alignment film of 0.05 µm was formed on the substrate, and this was subjected to a rubbing treatment. Next, a voltage of +700 V was applied to a conductive section A on the two electrodes side of the 2:1 comb-shaped electrodes, and a voltage of +500 V was applied to a conductive section B on the one electrode side. While the electric potential difference of 200 V was maintained, spacers (fine particles) were discharged from the diffuser and sprayed on the substrate in the same manner as Example 1.

In this state, electric lines of force were supposedly formed with a + bottom on the gap between the two electrodes to which +700 V was applied.

When the arranged state of the spacers spraying was observed, the spacers were linearly arranged on the ITO electrode portions on the two electrodes side of the 2:1 comb-shaped electrodes. The portion between the ITO electrodes was coincident with a position under the black matrix. Therefore, the spacers were arranged beneath the black matrix.

The conductive section A and the conductive section B of the resulting substrate were cut off, and laminated with a segment electrode substrate (segment electrode: striped electrode having an ITO line width of 80 µm and an ITO interval of 15 µm) as a general common electrode substrate by using a known method to form a liquid crystal display. This liquid crystal display had superior contrast and provided high-quality images.

EXAMPLE 7

Segment electrodes for use in an STN-type liquid crystal display (having an ITO electrode width of 80 µm, an interval of 15 µm and a plate thickness of 0.7 mm) were allowed to conduct outside the range of the display device in the same manner as Example 6 so that a comb-shaped electrode construction of 2:1 as illustrated in FIG. 10 was provided.

A polyimide alignment film of 0.05 µm was formed on the substrate thus manufactured, and this was subjected to a rubbing treatment.

When it is supposed that this is laminated with a color filter substrate having the 2:1 comb-shaped electrodes, a voltage of +50V was applied to the conductive section on the two-electrodes side corresponding to an RG stripe, while a voltage of +100 V was applied to the conductive section on the one-electrode side, and with the electric potential difference of 150 V being maintained, spacers were discharged from the diffuser and sprayed on the substrate.

In this voltage state, a + bottom was supposedly formed on the position in the center of the stripe electrode B.

After the spraying process, when the arranged state of the spacers were observed, they were linearly arranged in the center of the striped electrode width corresponding to B.

The conductive sections of the resulting substrate were cut off, and laminated with a common electrode substrate as a general segment electrode substrate by using a known method to form a liquid crystal display. In this liquid crystal display, although the colored layers of the respective colors RGB of the color filters were different in thickness, the spacers were arranged only on the B layer, thereby making it possible to provide a liquid crystal display with a more uniform cell gap.

EXAMPLE 8

On a common electrode substrate for use in an STN-type liquid crystal display (a color filter formation substrate having an aperture section of 80×285 µm for each of the pixels RGB (Red, Green and Blue), a width of a black matrix line of 20 µm, an ITO electrode width of 80 µm, an electrode interval of 15 µm and a plate thickness of 0.7 mm) was formed a polyimide alignment film of 0.05 µm, and this was subjected to a rubbing treatment by using a nylon brush. As a result, the polyimide film was −(negatively) charged.

Successively, the needle shaped leading ends of prober were applied to every other two of the linear striped electrodes of the common electrodes to apply voltages of +200 V.

In this state, electric lines of force were supposedly formed with a + bottom on the gap between the electrodes to which voltages of +200 V were applied.

In this state, spacers were discharged from the diffuser and sprayed on the substrate in the same manner as Example 1.

When the substrate was observed after the spraying process, the spacers were linearly arranged on the gap between the striped electrodes. Thus, the spacers were arranged beneath the black matrix.

The common electrode substrate thus obtained was laminated with a segment electrode substrate (segment electrodes: striped electrodes having an ITO line width of 80 µm and an ITO interval of 15 µm) by using a known method to form a liquid crystal display.

As a result, it was possible to obtain high-quality images with good contrast.

In the construction of the common electrodes of the STN-type liquid crystal display, conductive sections were formed on either side in the stripe direction in a manner as illustrated in FIG. 10, so that a comb-shaped electrode construction of 2:2 was formed. An alignment film was formed on the substrate, and this was subjected to a rubbing treatment. Successively, a voltage applying device is connected to the two conductive sections, and a DC voltage of +700 V was applied to one of the conductive sections, and a DC voltage of +500 V was applied to the other conductive section.

In this state, electric lines of force were supposedly formed with a + bottom on the gap between the electrodes to which the voltage of +700 V had been applied.

While this state is maintained, the spacers were sprayed in the same manner as Example 1. When the substrate was observed after the spraying process by using a microscope, the spacers were linearly arranged on the gap between the striped electrodes to which the voltages (+700 V) had been applied so as to form relatively +(positive).

Next, the voltage values were reversed so that a voltage of +500 V was applied to the one of the conductive sections and a voltage of +700 V was applied to the other conductive section, and the spacers were sprayed in the same manner as Example 1. When the substrate was observed after the spraying process by using a microscope, the spacers were linearly arranged on the gap between the striped electrodes different from those formed in the first spraying process, to which the voltages (+700 V) had been newly applied so as to form relatively +(positive).

The portion between the electrodes was coincident with a position under the black matrix. Therefore, the spacers were arranged beneath the black matrix.

The conductive sections of the resulting substrate were cut off, and laminated with a common electrode substrate as a general segment electrode substrate by using a known method to form a liquid crystal display, as a result that high-quality images with very high contrast were obtained.

EXAMPLE 9

In an electrode construction of common electrodes for use in an STN-type liquid crystal display (a color filter formation substrate having an aperture section of 80×280 μm for each of the pixels RGB (Red, Green and Blue), a width of a black matrix line of 40 μm, an ITO electrode width of 285 μm, an electrode interval of 35 μm and a plate thickness of 0.7 mm), conductive sections were formed on either side in the stripe direction in a manner as illustrated in FIG. 10, so that a comb-shaped electrode construction of 2:1 was formed. A polyimide alignment film of 0.05 μm was formed on the substrate, and this was subjected to a rubbing treatment.

A voltage of −1000 V (relatively +) was applied to the two-electrodes side, and a voltage of −1100 V (relatively −) was applied to the one-electrode side of the 2:1 comb-shaped electrode construction.

In this state, electric lines of force were supposedly formed with a relatively + bottom on the gap between the two aligned electrodes to which the voltage of −1000 V had been applied.

While this state is maintained, the spacers were discharged from diffuser and sprayed on the substrate in the same manner as Example 1.

When the substrate was observed after the spraying process, although both the charging polarity of the spacers and the polarity of the applied voltages were the same −(negative) polarity, the spacers were linearly arranged on the gap between the striped electrodes without being repulsed by the electric lines of force. Thus, the spacers were arranged beneath the black matrix.

The common electrode substrate obtained as described above was laminated with a segment electrode substrate by using a known method, and the conductive sections were cut off, thereby forming a liquid crystal display.

As a result, it was possible to obtain high-quality images with very high contrast.

EXAMPLE 10

Micropearl SP—Ni (Particle size; 6 ∞m, Sekisui Fine Chemical K.K.) was used as conductive fine particles. The dropping process of the conductive fine particles were carried out in the same manner as Example 1. Here, this operation naturally allowed the conductive fine particles to be +(positively) charged.

A comb-shaped electrode construction of 2:1 as illustrated in FIG. 10 was formed on a polyimide film by using ITO (ITO electrode width: 80 μm, electrode interval: 20 μm).

A voltage of −100 V was applied to the two-electrodes side of 2:1, and a voltage of +100 V was applied to the one-electrode side. Thus, a relatively − bottom was supposedly formed on the gap between two-side electrodes.

While this state was maintained, the fine particles were sprayed in the same manner as Example 1.

As a result, the fine particles were linearly arranged on the gap between the two electrodes to which the voltage of −100 V had been applied.

Moreover, when the voltage polarities to be applied were reversed (+100 V was applied to two-electrodes side of 2:1, and −100 V was applied to one-electrode side), electric lines of force were supposedly formed with a relative −(negative) bottom at a position in the center of the electrode width on the one-electrode side.

While this state was maintained, the fine particles were sprayed in the same manner as Example 1.

As a result, the fine particles were linearly arranged on a position in the center of the electrode width on one-electrode side.

The conductive fine particles thus arranged were transferred and press-bonded to a adhesive layer in a manner as shown in FIG. 9 so that a film locally having the conductive fine particles was obtained.

INDUSTRIAL APPLICABILITY

As described above, the fine particle arranging method of the present invention makes it possible to arrange fine particles accurately on a surface of an object. Therefore, the liquid crystal display of the present invention obtained by using the fine particle arranging method of the present invention allows most of the spacers to be arranged beneath the black matrix. Accordingly, even if light leakage occurs due to spacers, it gives no adverse effect on the display; thus, it becomes possible to ensure high display quality with good contrast. Moreover, in the anisotropic conductive film of the present invention obtained by using the fine particle arranging method of the present invention, the conductive fine particles are placed only on electrode portions requiring conductivity.

What is claimed is:

1. An anisotropic conductive film obtained by arranging conductive fine particles on surface of a film on which electrodes are formed, press-bonding an adhesive layer to said film, and exfoliating said film for transferring said arranged fine particles to said layer, wherein the step of arranging charged fine particles is carried out by alternately forming areas having a relatively high electric potential and areas having a relatively low electric potential on said surface of said film to form electric lines of force based upon the areas having the relatively high electrical potential and the areas having the relatively low electrical potential, and arranging charged fine particles at a relatively positive bottom position and/or a relatively negative bottom position of said electric lines of force.

2. An anisotropic conductive film obtained by spraying charged fine particles on a film on which plural electrodes are aligned in order to arrange fine particles on portions other than said electrodes on surface of said film, press-bonding an adhesive layer to said film, and exfoliating said film for transferring said arranged fine particles to said layer, wherein the step of spraying charged fine particles is carried out while areas having a relatively high electric potential and areas having a relatively low electric potential are alternately formed on the electrodes by applying voltages having different voltage values onto the aligned electrodes; and the application of said voltages having the different voltage values to said electrodes is carried out based upon a constant application pattern in which at least one of a relatively positive bottom position and a relatively negative bottom position of electric lines of force is made coincident with a gap position between said plural electrodes, said electric lines of force being formed based upon the voltages having different voltage values applied to the plural electrodes.

3. An anisotropic conductive film obtained by spraying charged fine particles on a film comprising striped electrodes constituted by aligning plural linear electrodes in order to arrange fine particles on portions other than said linear electrodes on surface of said film, press-bonding an adhesive layer to said film and exfoliating said film for transferring said arranged fine particles to said layer, wherein the step of spraying charged fine particles is carried out while areas having a relatively high electric potential and areas having a relatively low electric potential are alternately formed on the striped electrodes by applying voltages having different voltage values onto said plural linear electrodes aligned with a predetermined interval; and the application of said voltages having the different voltage values is carried out based upon a constant application pattern in which at least one of a relatively positive bottom position and a relatively negative bottom position of electric lines of force is made coincident with a gap position between said plural linear electrodes, said electric lines of force being formed based upon the voltages having different voltage values applied to the plural linear electrodes.

4. An anisotropic conductive film obtained by spraying charged fine particles on a film on which plural electrodes are aligned in order to arrange fine particle on said electrodes on surface of said film, press-bonding an adhesive layer to said film, and exfoliating said film or transferring said arranged fine particles to said layer, wherein the step of spraying charged fine particles is carried out while areas having a relatively high electric potential and areas having a relatively low electric potential are alternately formed on the electrodes by applying voltages having different voltage values onto the aligned electrodes; and the application of said voltages having the different voltage values to said electrodes is carried out based upon a constant application pattern in which at least one of a relatively positive bottom position and a relatively negative bottom position of electric lines of force is made coincident with a gap position between said plural electrodes, said electric lines of force being formed based upon the voltages having different voltage values applied to the plural electrodes.

5. An anisotropic conductive film obtained by spraying charged fine particles on a film comprising striped electrodes constituted by aligning plural linear electrodes in order to arrange fine particles on said linear electrodes on surface of said film, press-bonding an adhesive layer to said film, and exfoliating said film for transferring said arranged fine particles to said layer, wherein the step of spraying charged fine particles is carried out while areas having a relatively high electric potential and areas having a relatively low electric potential are alternately formed on the striped electrodes by applying voltages having different voltage values onto said plural linear electrodes aligned with a predetermined interval; and the application of said voltages having the different voltage values is carried out based upon a constant application pattern in which at least one of a relatively positive bottom position and a relatively negative bottom position of electric lines of force is made coincident with a gap position between said plural linear electrodes, said electric lines of force being formed based upon the voltages having different voltage values applied to the plural linear electrodes.

6. A process for producing an anisotropic conductive film, comprising arranging charged fine particles on surface of a film on which electrodes are formed, press-bonding an adhesive layer to said film, and exfoliating said film for transferring said arranged fine particles to said layer, wherein the step of arranging charged fine particles is carried out by alternately forming areas having a relatively high electric potential and areas having a relatively low electric potential on said surface of said film to form electric lines of force based upon the areas having the relatively high electric potential and the areas having the relatively low electric potential, and arranging charged fine particles at a relatively positive bottom position and/or a relatively negative bottom position of said electric lines of force.

7. A process for producing an anisotropic conductive film, comprising spraying charged fine particles on a film on which plural electrodes are aligned in order to arrange fine particles on portions other than said electrodes on surface of said film, press-bonding an adhesive layer to said film, and exfoliating said film for transferring said arranged fine particles to said layer, wherein the step of spraying charged fine particles is carried out while areas having a relatively high electric potential and areas having a relatively low electric potential are alternately formed on the electrodes by applying voltages having different voltage values onto the aligned electrodes; and the application of said voltages having the different voltage values to said electrodes is carried out based upon a constant application pattern in which at least one of a relatively positive bottom position and a relatively negative bottom position of electric lines of force is made coincident with a gap position between said plural electrodes, said electric lines of force being formed based upon the voltages having different voltage values applied to the plural electrodes.

8. A process for producing an anisotropic conductive film, comprising spraying charged fine particles on a film comprising striped electrodes constituted by aligning plural linear electrodes in order to arrange fine particles on portions other than said linear electrodes on surface of said film, press-bonding an adhesive layer to said film, and exfoliating said film for transferring said arranged fine particles to said layer;

wherein the step of spraying charged fine particles is carried out while areas having a relatively high electric potential and areas having a relatively low electric potential are alternately formed on the striped electrodes by applying voltages having different voltage values onto said plural linear electrodes aligned with a predetermined interval;

the application of said voltages having the different voltage values is carried out based upon a constant application pattern in which at least one of a relatively positive bottom position and a relatively negative bottom position of electric lines of force is made coincident with a gap position between said plural linear electrodes, said electric lines of force being formed based upon the voltages having different voltage values applied to the plural linear electrodes.

9. A process for producing an anisotropic conductive film, comprising spraying charged fine particles on a film on which plural electrodes are aligned in order to arrange fine particles on said electrodes on surface of said film, press-bonding an adhesive layer to said film, and exfoliating said film for transferring said arranged fine particles to said layer, wherein the step of spraying charged fine particles is carried out while areas having a relatively high electric potential and areas having a relatively low electric potential are alternately formed on the electrodes by applying voltages having different voltage values onto the aligned electrodes; and the application of said voltages having the different voltage values to said electrodes is carried out based upon a constant application pattern in which at least one of a relatively positive bottom position and a relatively negative bottom position of electric lines of force is made coincident with a gap position between said plural electrodes, said electric lines of force being based upon the voltages having different voltage values applied to the plural electrodes.

10. A process for producing an anisotropic conductive film, comprising spraying charged fine particles on a film comprising striped electrodes constituted by aligning plural linear electrodes in order to arrange fine particles on said linear electrodes on surface of said film, press-bonding an adhesive layer to said film, and exfoliating said film for transferring said arranged fine particles to said layer, wherein the step of spraying charged fine particles is carried out while areas having a relatively high electric potential and areas having a relatively low electric potential are alternately formed on the striped electrodes by applying voltages having different voltage values onto said plural linear electrodes aligned with a predetermined interval; and the application of said voltages having the different voltage values is carried out based upon a constant application pattern in which at least one of a relatively positive bottom position and a relatively negative bottom position of electric lines of force is made coincident with a gap position between said plural linear electrodes, said electric lines of force being formed based upon the voltages having different voltage values applied to the plural linear electrodes.

* * * * *